United States Patent [19]

Kiyohara et al.

[11] Patent Number: 4,967,338
[45] Date of Patent: Oct. 30, 1990

[54] LOOSELY COUPLED PIPELINE PROCESSOR

[75] Inventors: Tokuzo Kiyohara, Osaka; Masashi Deguchi, Nara, both of Japan

[73] Assignee: Matsushita Electric Industrial Co., Ltd., Osaka, Japan

[21] Appl. No.: 137,923

[22] Filed: Dec. 28, 1987

[30] Foreign Application Priority Data

Dec. 29, 1986 [JP] Japan ................................ 61-311023

[51] Int. Cl.⁵ .............................................. G06F 9/38
[52] U.S. Cl. .................................. 364/200; 364/231.8; 364/228.8; 364/263.1
[58] Field of Search ... 364/200 MS File, 900 MS File

[56] References Cited

U.S. PATENT DOCUMENTS

| | | | |
|---|---|---|---|
| 4,342,078 | 7/1982 | Tredennick et al. | 364/200 |
| 4,507,728 | 3/1985 | Sakamoto et al. | 364/200 |
| 4,597,041 | 6/1986 | Guyer et al. | 364/200 |
| 4,750,112 | 6/1988 | Jones et al. | 364/200 |

Primary Examiner—Gareth D. Shaw
Assistant Examiner—Debra A. Chun

[57] ABSTRACT

A central processing unit includes an instruction decoder (1), an operand address computation unit (2), an operand pre-fetch unit (3), a control information buffer (5), an arithmetic unit (4), an instruction fetch unit (6), a chip bus (7), and a bus controller (8). A process relating to the fetch of a memory operand is independent from main pipeline process having an instruction fetching stage, an instruction decoding stage, and an instruction execution stage. As a result, control information (13) in an instruction that the fetch of the memory operand is not required does not pass through the pipeline stage relating to the fetch of the memory operand thereby improving bus band width for memory operand accesses.

24 Claims, 9 Drawing Sheets

LOOSELY COUPLED PIPELINE PROCESSOR

BACKGROUND OF THE INVENTION

1. Field of the Invention

This invention relates generally to a method and apparatus for processing a microprogram for the execution of a machine language instruction in a computer controlled by a microprogram, and particularly to a central processing unit having loosely coupled pipeline stages.

2. Prior Art

One example of conventional pipeline processors is described in "Branch Prediction Strategies and Branch Target Buffer Design" by Jonny K. F. Lee and Alan Jay Smith, on pages 6–22 in COMPUTER; IEEE 1984 (17). A conventional pipeline processor comprises an instruction decoder, an operand address computation unit, an operand pre-fetch unit, and an arithmetic unit, and each unit processes an instruction by a cascade system. In the instruction decoder, an instruction code is decoded and control information for an instruction execution is sent to a following device. In the operand pre-fetch unit, the reading of data is performed in accordance with a computed address sent from the operand address computation unit. Here, when the fetch of an operand is required, such read data and the control information for the instruction execution are sent to the arithmetic unit. When the fetch of an operand is not required, control information for the instruction execution is sent to the arithmetic unit. It is to be noted that the control information is passed through pipeline stages relating to the fetch of the operand even when the fetch of the operand address is not required. As a result, there is a drawback that bus band width is limited by unnecessary passing of the control information.

SUMMARY OF THE INVENTION

The present invention has been developed in order to remove the above-described drawback inherent to the conventional pipeline processor.

It is, therefore, an object of the present invention to provide a new and useful pipeline processor having loosely coupled pipeline stages.

It is another object of the present invention to provide a loosely coupled pipeline processor for processing an instruction without unnecessary transmission of control information for instruction execution through pipeline stages when the fetch of a memory operand is not required.

It is a further object of the invention to provide a loosely coupled pipeline processor for improving bus band width.

In accordance with the present invention there is provided a central processing unit comprising: an instruction decoder for decoding an instruction to generate first control information, second control information, and third control information; an operand address computation unit for computing an operand address in accordance with said first control information; an operand pre-fetch unit for fetching and queueing a memory operand in accordance with said operand address, and for outputting said memory operand and a first signal representing that said memory operand has been queued therein; a control information buffer for queueing and outputting said second control information, and for outputting a second signal representing that said second control information is valid in accordance with said first signal and said third control information; and an arithmetic unit for receiving said second signal and for outputting a third signal representing that said arithmetic unit requires said second control information queued in said control information buffer thereby executing an operation in accordance with said second control information and said memory operand.

In accordance with the present invention there also is provided a central processing unit comprising: an instruction decoder for decoding an instruction to generate first control information, second control information, and third control information; an operand address computation unit for computing an operand address in accordance with said first control information; an operand pre-fetch unit for fetching and queueing a memory operand in accordance with said operand address, and for outputting said memory operand and a first signal representing that said memory operand has been queued therein; a control information buffer for queueing and outputting said second control information and said third control information, and for outputting a second signal representing that said second control information has been queued therein; and an arithmetic unit for receiving said first and said second signals and said third control information, and for outputting a third signal representing that said arithmetic unit requires said second control information from said control information buffer thereby executing an operation in accordance with said second control information and said memory operand.

Further in accordance with the present invention, a central processing unit includes an instruction decoder (1) for decoding an instruction and thereby generate first through third control signals representing control information (12), operation type information (13A), and operand address information (13B), respectively. This control information includes for operand address computation and a memory access, the operation type information includes data concerning the kind of operation and operands for sources and destinations and the operand address information includes a flag designating if an operand must be accessed from memory. An operand address computation unit (2) is connected to the instruction decoder and thereby receives the first control signal incorporating the first control information from the instruction decoder and, in response, computes the operand address. An operand prefetch unit (3) is connected to the operand address computation unit so that it receives the operand address signal indicating the computed operand address from the operand address computation unit. The operand prefetch unit fetches and queues a memory operand in accordance with the operand address and then generates a memory operand signal representing the queued memory operand and a first signal (9) representing that the memory operand has been queued therein. A control information buffer (5) is connected to the instruction decoder, receiving the first signal and the second control signal and then queuing the second control information. The control buffer also generates a second control information signal representing the queued second control information and a second signal representing that the second control information is valid on condition that the first signal is received by the control information buffer and that the third control information indicates that an operand in the memory is required. An execution unit (4) is connected to operand pre-fetch unit and the control information buffer. The execution unit receives the second signal and, in response, outputs a third signal representing that the execution unit requires the queued second control information to the control information buffer. The control information buffer outputs the second control information signal to the execution unit in response to the third signal, and the execution unit then receives the memory operand signal indicating the memory operand and the second control information signal indicating the second control information and thereafter executes an operation in accordance with the second control information and the memory operand.

In accordance with another aspect of the invention, a central processing unit includes an instruction decoder (1) for decoding an instruction to generate a first control signal indicating first control information (12), which includes information for operand address computation and a memory access, and a second control signal indicating second control information (13A), which includes information for representing the kind of operation, operands for sources and destinations, and third control information (13B) for showing whether or not an operand in the memory is required. An operand address computation unit (2) is connected to the instruction decoder for receiving the first control signal indicating the first control information from the instruction decoder and computing the operand address in accordance with the first control information and generating an operand address signal indicating the computed operand address. An operand prefetch unit (3) is connected to the operand address computation unit for receiving the operand address signal indicating the computed operand address from the operand address computation unit, for fetching and queuing a memory operand in accordance with the operand address and for then generating a memory operand signal representing the queued memory operand and a first signal (9) representing that the memory operand has been queued therein. A control information buffer (5A) is connected to the instruction decoder for receiving the second control signal and for then queuing the second control information and the third control information and for generating a second control information signal indicating the queued second control information and a third control information signal indicating the queued third control information and a second signal representing that the second control information has been queued therein. An execution unit (4A) is connected to both of the operand pre-fetch unit and the control information buffer for receiving the first signal, the second signal and the third control information signal and, in response to the received first signal and the second signal and the third control information signal, outputting to the control information buffer a third signal representing that the second control information is valid on condition that the first signal is received therein and that the third control information indicates that the execution unit requires an operand in the memory, wherein the control information buffer outputs the second control information signal to the execution unit in response to the third signal, and the execution unit then receives the memory operand signal indicating the memory operand and the second control information signal indicating the second control information and thereafter executes an operation in accordance with the second control information and the memory operand.

In accordance with still another aspect of the invention, a central processing unit includes an instruction decoder (1) for decoding an instruction to generate a first control signal indicating first control information (12), which includes information for operand address computation and a memory access, and a second control signal indicating second control information (16B), which includes information for representing the kind of operation, and third control information (18A), which includes information for representing operands for sources and destinations. An operand address computation unit (2) is connected to the instruction decoder for receiving the first control signal indicating the first control information from the instruction decoder and computing the operand address in accordance with the first control information and generating an operand address signal indicating the computed operand address. An operand prefetch unit (3) is connected to the operand address computation unit for receiving the operand address signal indicating the computed operand address from the operand address computation unit, for fetching and queuing a memory operand in accordance with the operand address and for then generating a memory operand signal representing the queued memory operand and a first signal (9) representing that the memory operand has been queued therein. A control information buffer (5B) is connected to the instruction decoder for receiving the first signal and the second control signal and for then queuing the second control information and the third control information and generating a second control information signal indicating the queued second control information and a second signal representing that the second control information and the third control information are valid on condition that the first signal is received by the control information buffer and that the third control information requires the memory operand. An execution unit (4) is connected to both of the operand pre-fetch unit and the control information buffer for receiving the second signal and, in response to the received second signal, outputting a third signal representing that the execution unit requires the queued second control information to the control information buffer. The control information buffer outputs the second control information signal and a third control information signal indicating the third control information to the execution unit in response to the third signal, and the execution unit then receives the memory operand signal indicating the memory operand and the second control information signal indicating the second and third control information. The execution unit thereafter executes an operation in accordance with the second and third control information and the memory operand.

In accordance with another aspect of the invention, a central processing unit comprises an instruction decoder (1) for decoding an instruction to generate a first control signal indicating first control information (12), which includes information for operand address computation and a memory access. A second control signal indicates second control information (16B), which includes information for representing the kind of operation, and third control information (18A), which includes information for representing operands for sources and destinations. An operand address computation unit (2) is connected to the instruction decoder and receives the first control signal indicating the first control information from the instruction decoder and computes the operand address in accordance with the first control information. The operand address computation unit further generates an operand address signal indicating the computed operand address. An operand prefetch unit (3) is connected to the operand address computation unit for receiving the operand address signal indicating the computed operand address from the operand address computation unit, for fetching and queuing a memory operand in accordance with the operand address and for then generating a memory operand signal representing the queued memory operand and a first signal (9) representing that the memory operand has been queued therein. A control information buffer (5C) is connected to the instruction decoder for receiving the second control signal and for then queuing the second control information and the third control information and for generating a second control information signal indicating the queued second and third control information and a second signal representing that the second and third control information have been queued therein. Finally, an execution unit (4B) is connected to both of the operand prefetch unit and the control information buffer for receiving the first signal and the second signal. In response to the received first and second signals, the operand prefetch unit outputs to the control information buffer a third signal representing that the second control information and the third control information is valid on condition that the first signal is received therein and that the third control information indicates that the execution unit requires an operand in the memory. The control information buffer outputs the second control information signal to the execution unit in response to the third signal, and the execution unit then receives the memory operand signal indicating the memory operand and the second control information signal indicating the second control information and thereafter executes an operation in accordance with the second control information, the third control information and the memory operand.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the embodiments of the present invention, a conventional method will be discussed first for a better understanding of the present invention.

Figure 8:
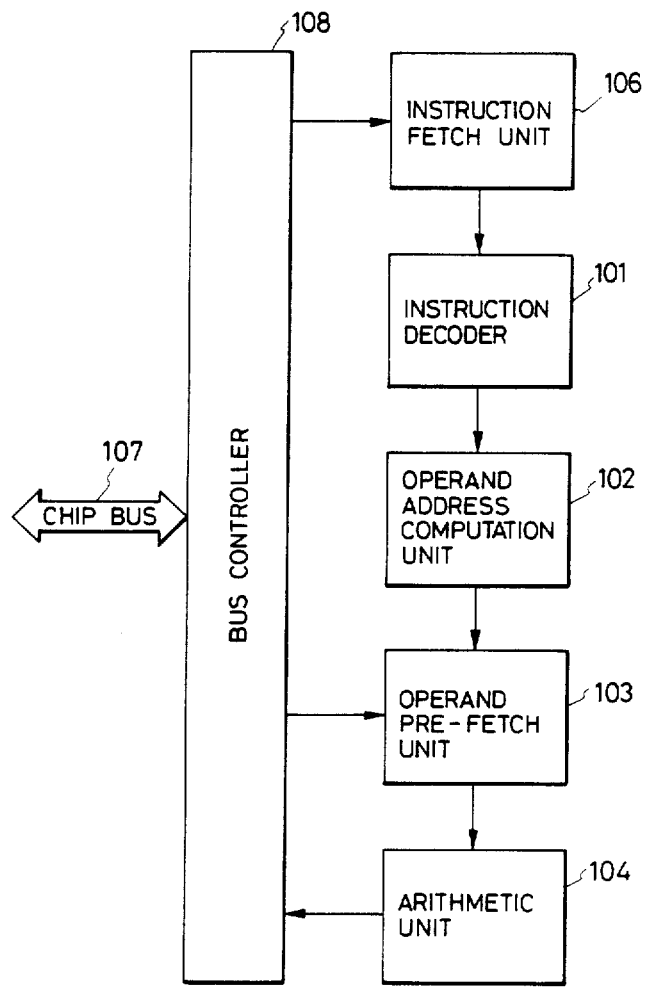
FIG. 8 is a schematic block diagram useful for understanding a conventional data processing system in a conventional pipeline processor.

FIG. 8 illustrates one example of a conventional data processing method. A conventional pipeline processor comprises an instruction decoder 101, an operand address computation unit 102, an operand pre-fetch unit 103, an arithmetic unit 104, an instruction fetch unit 106, a chip bus 107, and a bus controller 108. In the instruction decoder 101, an instruction code fetched at the instruction fetch unit 106 is decoded. Then, control information relating to instruction execution is generated at the instruction decoder 101, and is sent to the operand address computation unit 102. When the fetch of an operand in memory is required, control information for an operand address computation and control information for a memory access are also sent to the operand address computation unit 102. Besides, if the writing into the memory is required, control information for an operand address computation is sent to the operand address computation unit 102. In the operand address computation unit 102, a required operand address thereof is computed and is sent to the operand pre-fetch unit 103, and control information for a memory access and the control information relating to the instruction execution are also sent to the operand pre-fetch unit 103. In the operand pre-fetch unit 103, a memory operand is accessed via the bus controller 108 and the chip bus 107, and the reading out of the memory operand is performed in accordance with the operand address sent from the operand address computation unit 102. Then, the read out operand data, the address for the writing into the memory, and the control information relating to the instruction execution are sent to the arithmetic unit 104. In the arithmetic unit 104, an operation is executed in accordance with the read out operand data sent from the operand pre-fetch unit 103 and the control information relating to the instruction execution. If the writing into the memory is required, the result of the operation is written into the memory via the bus controller 108 and the chip bus 107 in accordance with the writing address sent from the operand pre-fetch unit 103.

The operation of the conventional pipeline processor having the above-mentioned structure will be described hereinbellow with reference to FIG. 9.

Figure 9:
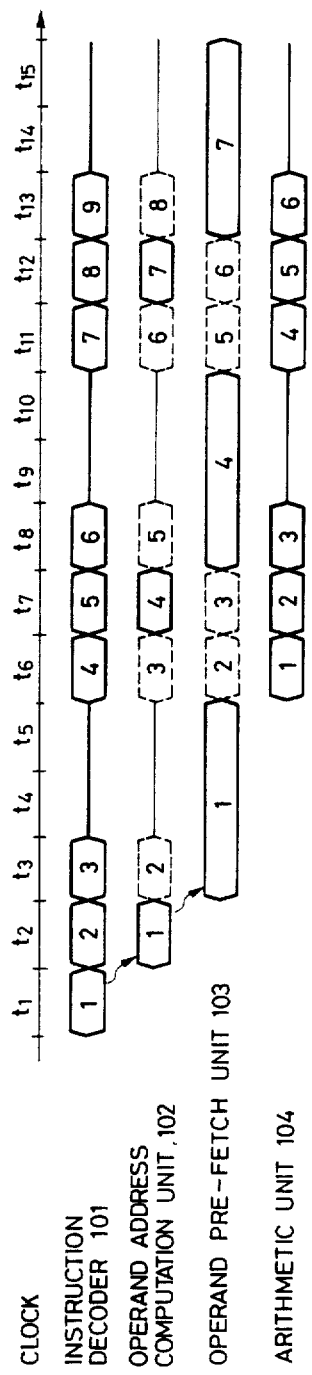
FIG. 9 is a timing chart useful for understanding the operation of the system illustrated in FIG. 8.

FIG. 9 illustrates a timing chart of the operation of the conventional pipeline processor of FIG. 8. In FIG. 9, the number of clock pulses in each unit is assumed as follows: one clock for the instruction decoder 101, one clock (pulse) for the operand address computation unit 102, three clocks for the operand pre-fetch unit 103, and one clock for the arithmetic unit 104. It is also assumed that the executing instruction sequence consists of three instructions, i.e. one instruction in which fetching a memory operand and two instructions in which fetching the same. Namely, instructions (1), (4), and (7) require the fetch of a memory operand, and instructions (2), (3), (5), (6), (8), and (9) do not require the fetch thereof. Moreover, it is assumed that the begining state on the pipeline process is an initialized state, for example, a state just after the execution of a branch instruction.

The instruction (1) is decoded in the instruction decoder 101 in the time period of clock t1, and the control information relating to the instruction execution and the control information for the memory access and operand address computation are sent to the operand address computation unit 102. In clock t2, the operand address is computed in the operand address computation unit 102 in accordance with the control information for the memory access and operand address computation. The operand address, the control information relating to the instruction execution, and the control information for the memory access are also sent to the operand pre-fetch unit 103. While clocks t3-t5, the memory operand is read out in the operand pre-fetch unit 103 in accordance with the control information for the address computation and memory access, and the control information for the memory access and the control information relating to the instruction execution are sent to the arithmetic unit 104. In clock t6, the operation is executed in the arithmetic unit 104 in accordance with the control information relating to the instruction execution.

The instruction (2) is decoded in the instruction decoder 101 in the clock t2, only control information relating to the execution of the instruction (2) is sent to the operand address computation unit 102 because the instruction (2) does not require the fetch of the memory operand. In the clock t3, although this instruction (2) is passed through the operand address computation unit 102 as a pipeline stage, since there are no control information for the address computation and memory access, the control information relating to the execution of the instruction (2) is sent to the operand pre-fetch unit 103. However, since the execution of the instruction (1) in the operand pre-fetch unit 103 is not completed, the sending of the control information relating to the execution of the instruction (2) is actually delayed until clock t6. In the clock t6, although the instruction (2) is also passed through the operand pre-fetch unit 103 as a pipeline stage, since there is no control information for the operand address computation and memory access, only the control information for the execution of the instruction (2) is sent to the arithmetic unit 104. In clock t7, the operation is executed in the arithmetic unit 104 in accordance with the control information for the execution of the instruction (2). Such pipeline process is continued as shown in FIG. 9.

However, the above-mentioned pipeline process brings about the following disadvantage. The transmission of unnecessary information in instructions is required even when an instruction relates to the operation of registers, where the fetch of a memory operand is not required. Therefore, such unnecessary passing of the information brings about a limitation of bus band width used for operand access in a block of instruction that the fetch of a memory operand is required. As will be seen from FIG. 9, assuming that the ratio of the number of instructions in which the fetch of memory operand is required to the number of instructions in which the fetch of the same is not required is 1:2, and that the ratio of an executing time for fetching the same to an excecuting time for non-fetching is 3:1, the using of the bus band width is limitted to 60%.

Figure 1:
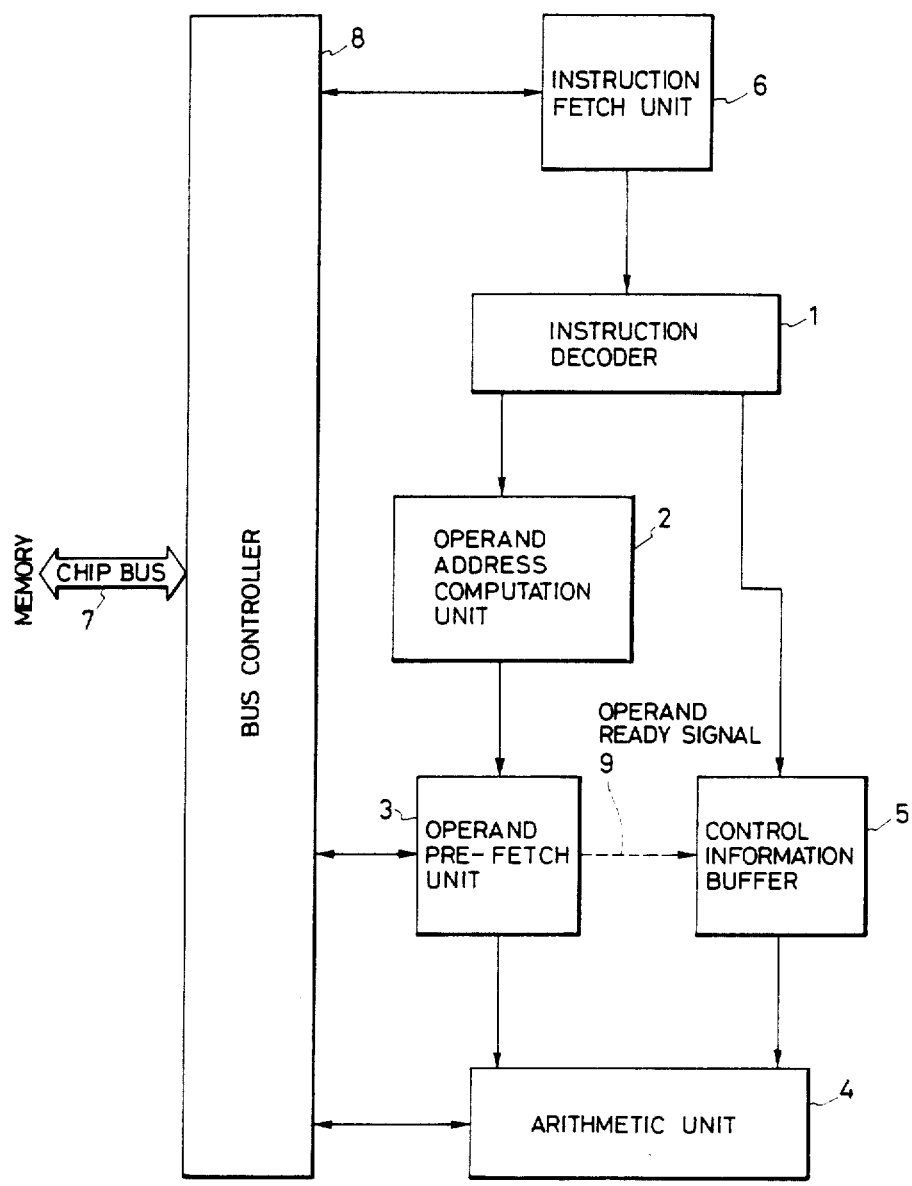
FIG. 1 is a schematic block diagram useful for understanding an embodiment of the data processing system in a loosely coupled pipeline processor according to the present invention.

FIG. 1 illustrates a schematic block diagram showing an embodiment of the data processing system of a loosely coupled pipeline processor according to the present invention. The loosely coupled pipeline processor comprises an instruction decoder 1 for decoding instructions, an operand address computation unit 2 for computing the address of an operand, an operand pre-fetch unit 3 for previously fetching an operand, an arithmetic unit 4 for executing operations, a control information buffer 5, an instruction fetch unit 6 for fetching instructions, a chip bus 7, and a bus controller 8. In the instruction decoder 1, an instruction code accepted at the instruction fetch unit 6 is decoded. Then, control information for an address computation is sent to the operand address computation unit 2, and control information for instruction execution is sent to the control information buffer 5. In the operand address computation unit 2, the address of an operand is computed, and control information for memory access is sent to the operand pre-fetch unit 3. In the operand pre-fetch unit 3, operand data in a memory is accessed via the bus controller 8 and the chip bus 7, and an operand ready signal 9 is sent to the control information buffer 5. In the control information buffer 5, the control information sent from the instruction decoder 1 is queued, and is sent to the arithmetic unit 4 in accordance with a request signal from the arithmetic unit 4. The above is a brief description of the operation of the system of FIG. 1.

Figure 2:
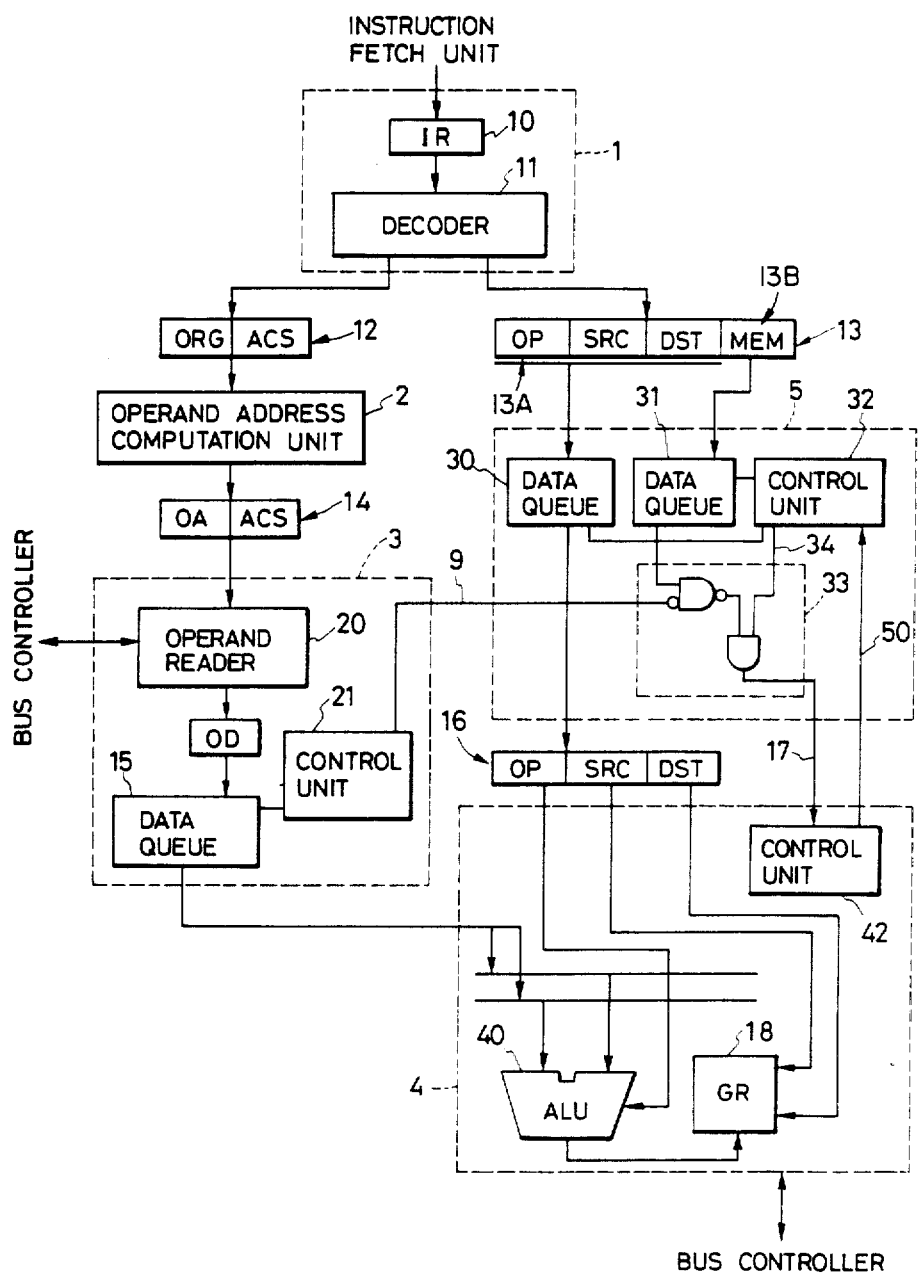
FIG. 2 is a detailed diagram for the description of a part of the diagram of FIG. 1.

FIG. 2 is a detailed diagram for the description of a part of the block diagram of FIG. 1. The instruction decoder 1 comprises an instruction register (IR) 10 and a decoder 11. In the instruction decoder 1, an instruction code read out in the instruction fetch unit 6 is stored into the IR 10, and decoded by the decoder 11. When the fetch of a memory operand is required, control information 12 for an address computation and a memory access is sent to the operand address computation unit 2 and control information 13 for instruction execution is sent to the control information buffer 5. The control information 12 comprises information (OAG) for operand address computation and information (ACS) for a memory access. When the fetch of an operand in the memory is not required, only the control information 13 is sent to the control information buffer 5. The control information 13 comprises information (OP) showing the kind of operation, information (SRC) designating a source operand, information (DST) showing a destination operand, and information (MEM) showing whether an operand in the memory is required or not.

In the operand address computation unit 2, the address of the operand is computed in accordance with the information OAG in the control information 12, and control information 14 is sent to the operand pre-fetch unit 3. The control information 14 comprises an operand address (OA) and the information ACS.

The operand pre-fetch unit 3 comprises an operand reader 20, a data queue portion 15, and a control unit 21. In the operand pre-fetch unit 3, if the fetch of an operand in memory is required, the operand reader 20 outputs a request signal (not shown) to the bus control unit 8. Then, the memory operand is read out in accordance with the operand address OA and the information ACS in the control information 14 sent from the operand address computation unit 2, and such read out memory operand data (OD) is queued in the data queue portion 15. The data OD is sent to the arithmetic unit 4 as an input data for executing an operation. The control unit 21 referres to the status of the data queue portion 15, and outputs the operand ready signal 9 to the control information buffer 5 when at least one operand datum OD exists in the data queue portion 15.

The control information buffer 5 comprises a data queue portion 30 for the information OP, SRC, and DST, a data queue portion 31 for the information MEM, a control unit 32 for controlling the sending of the information in the data queue portion 30, and a synchronizing circuit means 33. In the control information buffer 5, the information OP, SRC, and DST in the control information 13 sent from the instruction decoder 1 is queued in the data queue portion 30, and the information MEM in the control information 13 is queued in the data queue portion 31. The control unit 32 outputs a signal 34 to the synchronizing circuit means 33 when the information OP, SRC, and DST, i.e. information 16 is queued in the data queue portion 30, and sends the information 16 to the arithmetic unit 4 when receiving the request signal 50 from the arithmetic unit 4. The synchronizing circuit means 33 generates an enabling signal 17 representing that the information 16 is valid in accordance with the operand ready signal 9, the information MEM sent from the data queue portion 31, and the signal from the control unit 32.

Thus, information 16 in the control information 13 is sent to the arithmetic unit 4 in accordance with a request signal 50 fed therefrom. Namely, if the information 16 needs the fetch of memory operand data, it is required that the status of the data queue portion 15 is considered. In other words, whether the operand ready signal 9 is outputted or not is referred by the synchronising circuit means 33. If the operand ready signal 9 is not sent from the operand pre-fetch unit 3, i.e. if there is no read out operand datum in the data queue portion 15, the transmission of the information 16 is delayed. It is to be noted that when the enabling signal 17 is invalid, the arithmetic unit 4 does not send the request signal 50 to the control information buffer 5. More specifically, when the information MEM indicates that an operand in memory has to be fetched, and when the operand ready signal 9 is not sent, the control information 16 is in invalid state. Therefore, the sending of the information 16 is delayed until the operand ready signal 9 is sent to the control information buffer 5.

The arithmetic unit 4 comprises an arithmetic logic unit (ALU) 40, a register bank 18 having a plurality of general (purpose) registers, and a control unit 42. In the arithmetic unit 4, the control unit 42 outputs the request signal 50 to the control unit 32 in the control information buffer 5 in accordance with the enabling signal 17 sent from the control information buffer 5. It is to be noted that the transmission of the information 16 can be performed by a handshake control. In this case, the request signal 50 can be outputted before the enabling signal 17 is received in the control unit 42. When executing operation in accordance with the information 16 and the enabling signal 17, if the information SRC and the information DST in the information 16 shows a general register number, its data is read out from its general register in the register bank 18, and the operation is performed in accordance with the information OP. Then, the result of the operation is stored in the general register where the information DST shows. If the information SRC or the information DST shows the memory operand, the data OD sent from the operand pre-fetch unit 3 is used as input data of the ALU 40. In addition, if the information DST shows the memory operand, it is performed that the result of its operation is written into the memory via the bus control unit 8.

Figure 3:
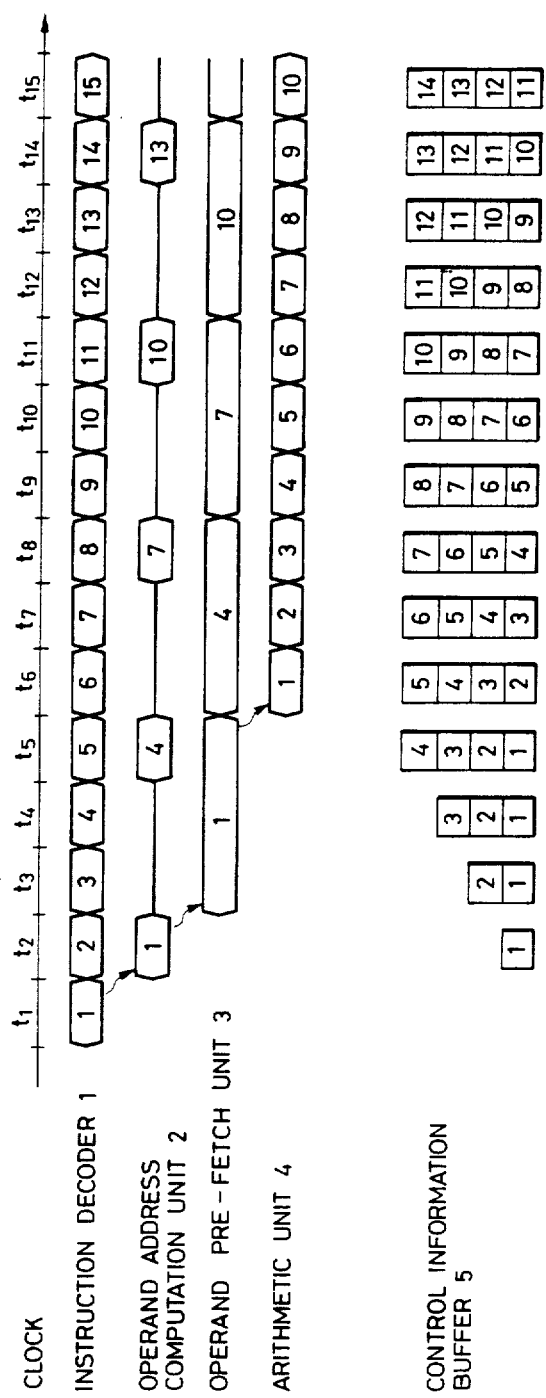
FIG. 3 is a timing chart useful for understanding the operation of the system illustrated in FIGS. 1 and 2.

The actual operation of the loosely coupled pipeline processor having the above-mentioned structure of FIG. 1 and FIG. 2 according to the present invention will be described hereinbelow with reference to FIG. 3 showing a timing chart associated with an embodiment of the present invention.

In FIG. 3, instructions executed in the instruction decoder 1, the operand address computation unit 2, the operand pre-fetch unit 3, and the arithmetic unit 4, and the resulted queueing status in the data queue portion 30 of the control information buffer 5 are shown by the unit of a clock. It is assumed that the required number of the clock pulses in each unit for pipeline process is as follows: one clock for the instruction decoder 1, one clock for the operand address computation unit 2, three clocks for the operand pre-fetch unit 3, and one clock for the arithmetic unit 4. It is also assumed that executing instruction sequence consists of three instructions, i.e. one instruction that the fetch of a memory operand is required and two instructions that the fetch is not required. Namely, instructions (1), (4), (7), (10), and (13) require the fetch of a memory operand, and instructions (2), (3), (5), (6), (8), (9), (11), (12), (14), and (15) do not require the fetch thereof. Moreover, it is assumed that the begining state of the pipeline process is an initialized state, e.g. a state just after the execution of a branch instruction.

The instruction (1) is decoded in the instruction decoder 1 in a clock t1, and control information 12 is sent to the operand address computation unit 2, as well as control information 13 is sent to the control information buffer 5. However, since the operand ready signal 9 is not ready in the control information buffer 5, control information 16 is held in the control information buffer 5. Thus, the transmission of the control information 16 is delayed. In clock t2, an operand address is computed in the operand address computation unit 2 in accordance with the control information 12. While clocks t3-t5, the operand is read out in the operand pre-fetch unit 3, and the operand ready signal 9 is sent to the control information buffer 5. Then, the control information 16 being stored in the data queue portion 30 of the control information buffer 5 is sent to the arithmetic unit 4. In clock t6, the operation is executed in the arithmetic unit 4 in accordance with the control information 16. 20 The instruction (2) is decoded in the instruction decoder 1 during the clock t2, and then only control information 13 according to the instruction (2) is sent to the control information buffer 5 because the instruction (2) does not need the fetch of the memory operand. However, since the sending of the operand ready signal 9 is not completed yet, control information 16 according to the instruction (2) is held in the data queue portion 30. The sending of this control information 16 is delayed until clock t7. In this embodiment, the operand pre-fetch unit 3 acts as a control factor, or a velocity controlling step, and therefore 100% of the bus band width is used for the operand access as shown in FIG. 3.

Figure 4:
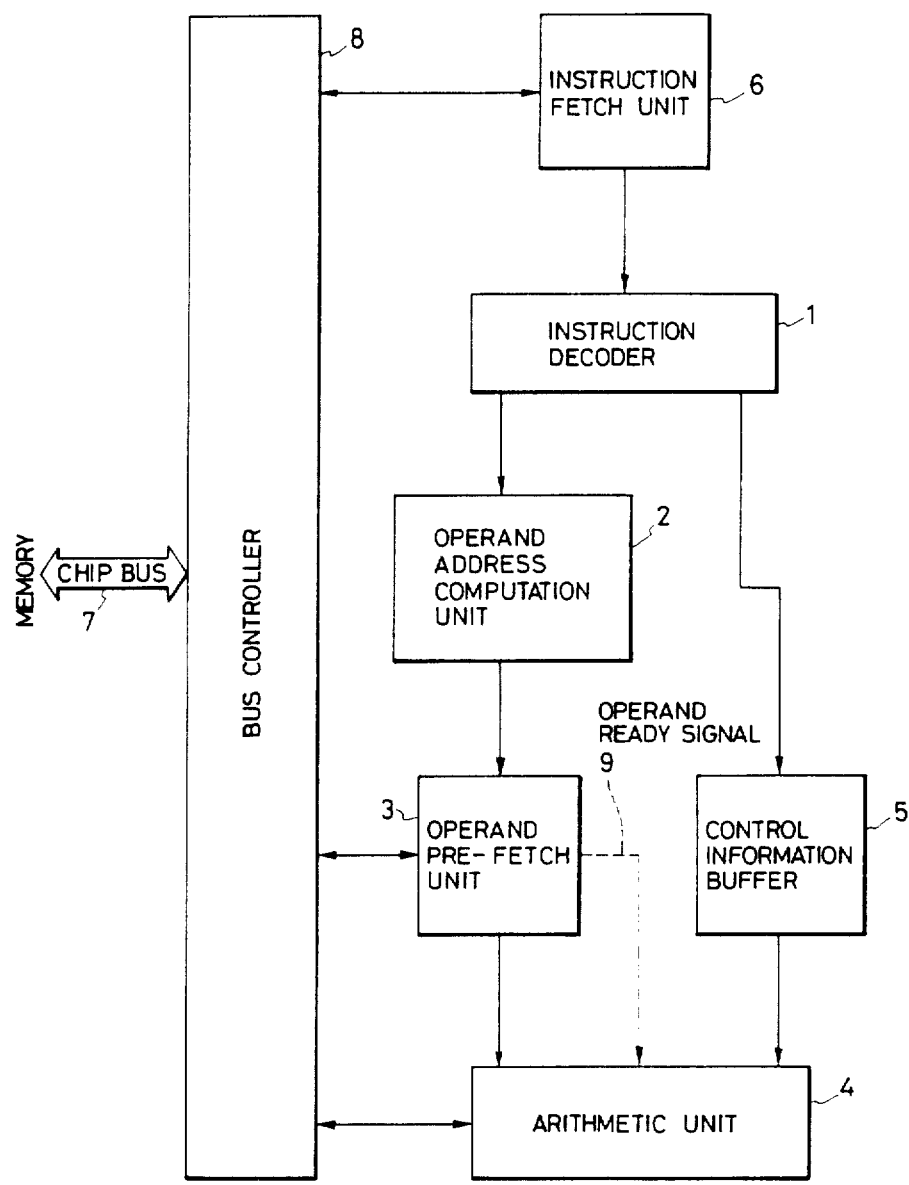
FIG. 4 is a schematic block diagram useful for understanding a second embodiment of the data processing system in the loosely coupled pipeline processor according to the present invention.
Figure 5:
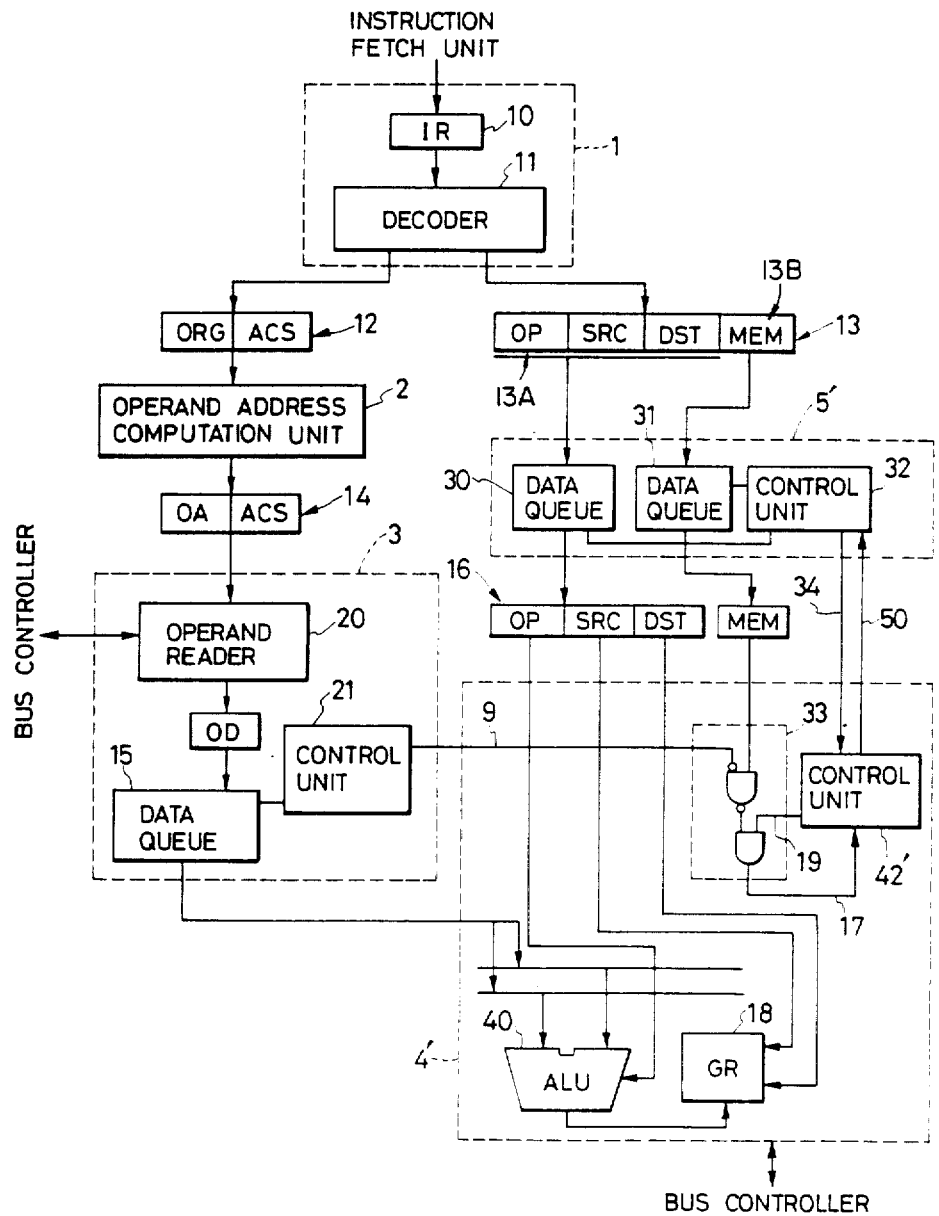
FIG. 5 is a detailed diagram for the description of a part of the diagram of FIG. 4.

FIG. 4 illustrates the structure of the second embodiment of loosely coupled pipeline processors according to the present invention. In FIG. 5, elements, except for a control information buffer 5A, and an arithmetic unit 4A, designated at the same reference numerals as in FIG. 1 respectively have the same function as those in FIG. 1. The operand ready signal 9 is not sent to the control information buffer 5A but is sent to the arithmetic unit 4A. The control information buffer 5A and the arithmetic unit 4A will be described with reference to FIG. 5.

FIG. 5 illustrates a detailed diagram of FIG. 4. In FIG. 5, the control information buffer 5A comprises data queue portions 30 and 31 and control unit 32, and the arithmetic unit 4A comprises ALU 40, register bank 18, synchronizing circuit means 33, and a control unit 42A. Since the arithmetic unit 4A has the synchronizing circuit means 33, the operand ready signal 9 is sent to the arithmetic unit 4A. The control unit 32 sends signal 34 representing that information 16 has been queued in data queue portion 30 to the control unit 42A. When the control unit 42A accepts signal 34 outputted from control unit 32, a signal 19 representing that the signal 34 has been received is outputted to the synchronizing circuit means 33. The synchronizing circuit means 33 outputs the enabling signal 17 to the control unit 42A in accordance with the operand ready signal 9, the information MEM sent from the control information buffer 5A, and the signal 19. Then, the request signal 50 is outputted to the control unit 32 for accepting the information signal 16 from the control information buffer 5A. Thus, an operation is executed at the arithmetic unit 4A.

Figure 6:
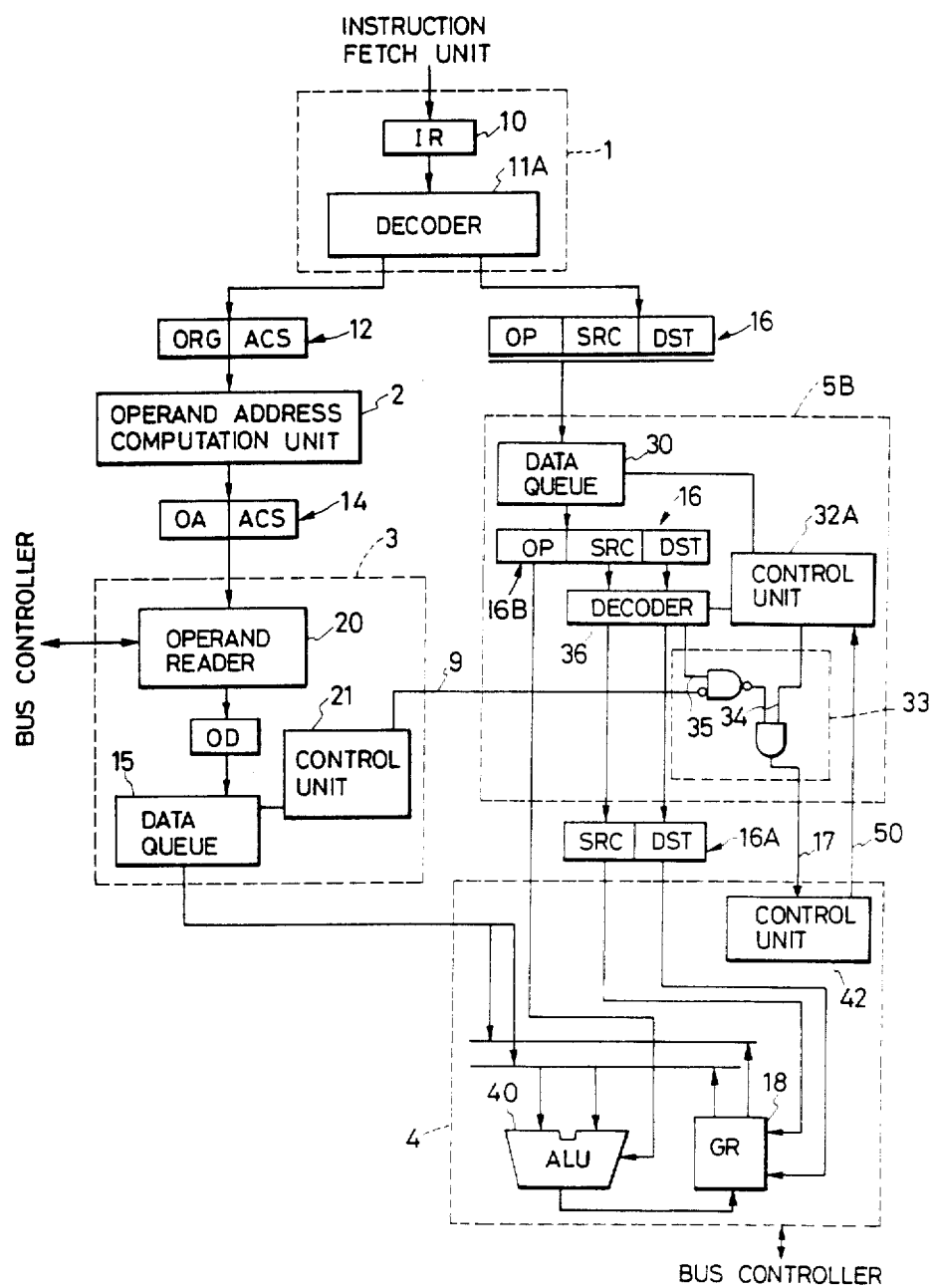
FIG. 6 is a detailed diagram useful for understanding a third embodiment of the data processing system in the loosely coupled pipeline processor according to the present invention.

FIG. 6 is a detailed diagram useful for understanding a third embodiment of the data processing system in the loosely coupled pipeline processor according to the present invention. In FIG. 6, the instruction decoder 11 comprises instruction register 10 and a decoder 11A, and a control information buffer 5B comprises data queue portion 30, a decoder 36, synchronizing circuit means 33, and a control unit 32A. The decoder 11A sends only the information 16 to the control information buffer 5B. If the information 16 is queued in the data queue 30, since the decoder 36 can read the information 16A having SRC and DST, the information 16A can be decoded for generating a signal 35 representing that the information SRC and/or DST require the memory operand. Then the signal 35 is sent to the synchronizing circuit means 33, and operates as the information MEM in FIG. 2. The decoder 36 also sends the information 16A to the arithmetic unit 4 when the control unit 32A receives the request signal 50 from the arithmetic unit 4. At this time, the information 16A may not pass through the decoder 36.

Figure 7:
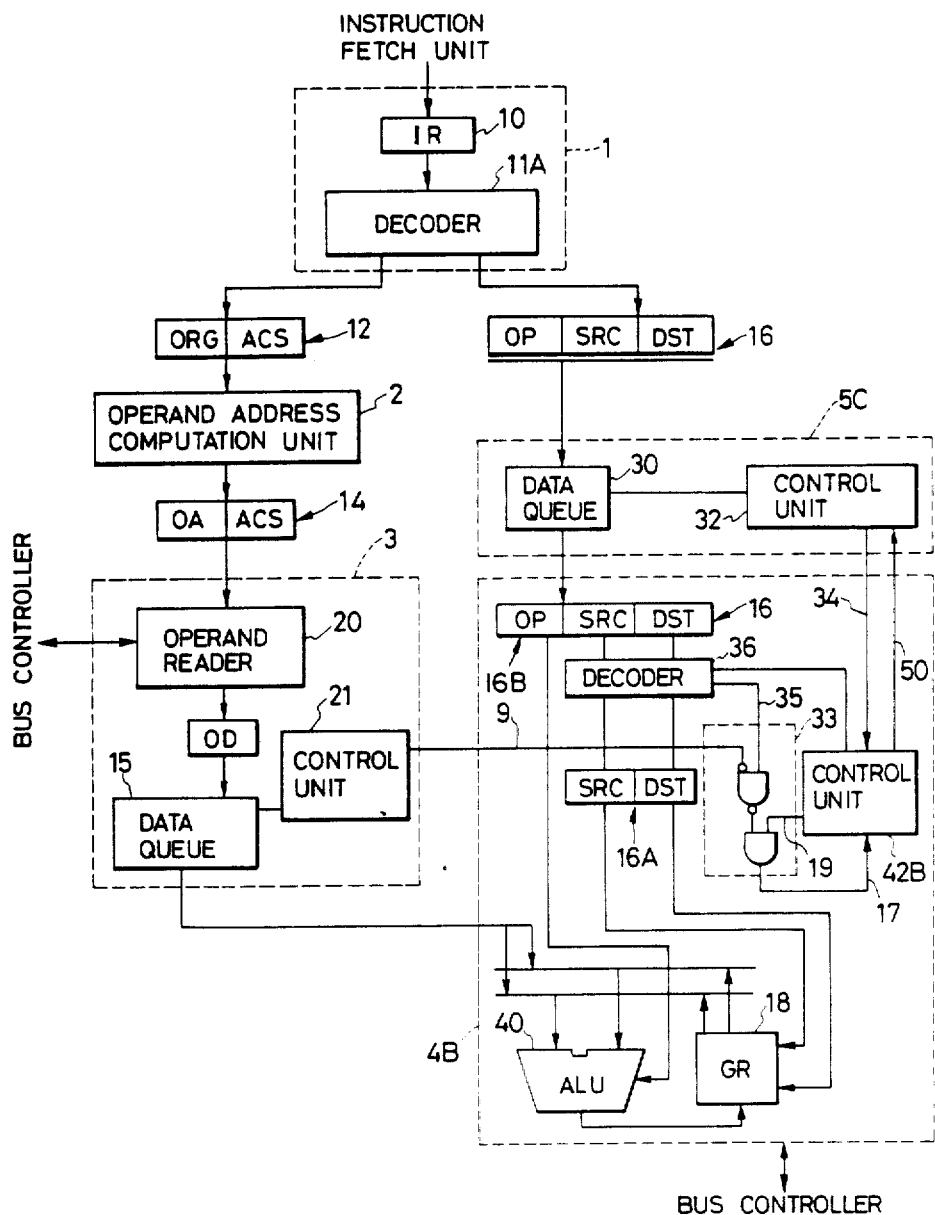
FIG. 7 is a detailed diagram useful for understanding a fourth embodiment of the data processing system in the loosely coupled pipeline processor according to the present invention.

FIG. 7 is a detailed diagram useful for understanding a fourth embodiment of the data processing system in the loosely coupled pipeline processor according to the present invention. In FIG. 7, a control information buffer 5C comprises data queue portion 30 and contol unit 32B, and arithmetic unit 4B comprises decoder 36, synchronizing circuit means 33, a control unit 42C, ALU 40, and register bank 18. When the control unit 42B receives the enabling signal 17, the information 16 is sent to the arithmetic unit 30. At this time, the information 16A may send from the decoder 36 to the register bank.

As will be seen from the above description of the present invention, the control information 12 for controlling the operand address computation unit 2 and the operand pre-fetch unit 3 and the control information 13 for controlling the arithmetic unit 4 are separately outputted from the instruction decoder 1. The control information 13 is queued to the control information buffer 5, and the information OP, SRC, and DST are sent to the arithmetic unit 4 in accordance with the request signal 50 from the arithmetic unit 4. It is to be noted that the transmission of the information 16 can be performed by a handshake control. In this case, the request signal 50 can be outputted before the enabling signal 17 is received in the control unit of the arithmetic unit. Thus, a process relating to the fetch of an operand is independent as a secondary pipeline stage from the main pipeline stage comprising steps of an instruction fetch, an instruction decoding, and an instruction execution. When the instruction does not contain a process of the fetch of the memory operand, e.g. the instruction execution of an operation between registers, only the main pipeline stage is acted. Therefore, control information (13) in an instruction that the fetch of the memory operand is not required does not pass through the pipeline stage relating to the fetch of the memory operand thereby improving the bus band width. As a result, overhead, required for filling of pipeline processes just after the execution of a branch instruction, is avoidable. Moreover, in these embodiments, since the operand pre-fetch unit 3 has a queueing function, the method of the pipeline process according to the present invention is adaptable even if the ratio of the number of instructions in which the fetch of memory operand is required to the number of instructions in which the fetch of the same is not required is partly changed.

From the foregoing, it will be understood that effective pipeline process can be actualized by using a loosely coupled pipeline processor of the present invention.

In the above-mentioned embodiments, an address converting unit may be provided to the operand pre-fetch unit 3, the instruction fetch unit 6, or the bus controller 8 when the present invention is applied to a virtual memory technique. Besides, a cache memory may also be provided to the operand pre-fetch unit 3, the instruction fetch unit 6, or the bus controller 8 when a cache memory technique is applied to the present invention. Particularly, if a data cache memory is provided to the operand pre-fetch unit 3, the number of the required clock pulses in the operand pre-fetch unit 3 can considerablly be reduced. In addition, the operand address computation unit 2 and the operand pre-fetch unit 3 may be combined each other as one unit, and each unit may comprise a plurality of pipeline stages.

The above-described embodiments are just examples of the present invention, and therefore, it will be apparent for those skilled in the art that many modifications and variations may be made without departing from the scope of the present invention.

What is claimed is:

1. A central processing unit comprising:
   (a) an instruction decoder for decoding an instruction and, in response, generating first, second and third control signals representing respective first, second and third control information, said first control information including information for operand address computation and memory access, said second information including (a) information designating a category of operation and (b) operands designating sources and destinations of information, said third control information including information designation if an operand stored in memory is required:
   (b) an operand address computation unit for computing an operand address in in response to said first control information received from said instruction decoder and supplying an operand address signal in response;

(c) an operand pre-fetch unit for fetching and queuing a memory operand in response to said operand address signal, and for outputting (a) said memory operand and (b) a first signal indicating that said memory operand has been queued in said operand pre-fetch unit;

(d) a control information buffer receiving said first, second and third control signals from said instruction decoder, said control information buffer queuing and outputting said second control information, and for outputting a second signal indicating that said second control information is valid in response to receiving said first signal and said third control information indicating that an operand is required from memory; and (e) an execution unit receiving said second signal from said control information buffer and, in response thereto, outputting a third signal representing that said arithmetic unit requires said second control information queued in said control information buffer wherein said control information buffer outputs the second control information signal to said execution unit in response to the third signal, and said execution unit receives the memory operand signal and the second control information signal and, in response thereto, executes an operation.

2. A central processing unit as claimed in claim 1, wherein said operand pre-fetch unit includes:

(i) an operand reader for reading said memory operand of said first control signal from said operand computation unit;

(ii) a first storage means for queuing said memory operand and for supplying said queued memory operand to said arithmetic unit; and (iii) a first control unit for supplying said first signal to said control information buffer when said memory operand is queued in said first storage means.

3. A central processing unit as claimed in claim 1, wherein said control information buffer includes:

(i) a second storage means for queuing said second control information and supplying said queued second control information to said arithmetic unit;

(ii) a third storage means for queuing the third control information and generating a third control signal representing said third control information;

(iii) a second control unit connected to said second storage means for outputting a fourth signal representing that said second information has been queued in said second storage means, and for receiving said third signal; and (iv) a synchronizing circuit means responsive to said first and fourth signals and to said third control information from said third storage means for outputting said second signal.

4. A central processing unit as claimed in claim 1, wherein said arithmetic unit includes:

(i) an arithmetic logic unit for performing arithmetic and logic operations on said operands;

(ii) and a third control unit for receiving said second signal and for outputting said third signal to said control information buffer.

5. A central processing unit comprising:

(a) an instruction decoder for decoding an instruction to generate, in response thereto, an operand address signal, a data type signal, and a memory operand flag signal:

(b) an operand address computation unit for computing an operand address in response to said operand address signal;

(c) an operand pre-fetch unit for fetching and queuing a memory operand stored at a memory location corresponding to said computed operand address, and for supplying said memory operand stored at said computed operand address and supplying a first signal representing that said memory operand has been queued therein;

(d) a control information buffer for queuing and outputting said data type signal and said memory operand flag signal, and for outputting a second signal representing that said data type signal has been queued therein; and (e) an arithmetic unit for receiving said first and said second signals and said third control information, and for outputting a third signal representing that said arithmetic unit requires said second control information from said control information buffer thereby executing an operation in accordance with said second control information and said memory operand.

6. A central processing unit as claimed in claim 5, wherein said operand pre-fetch unit includes:

(i) an operand reader for reading said memory operand of said first control signal from said operand computation unit;

(ii) a first storage means for queuing said memory operand and for supplying said queued memory operand to said arithmetic unit; and (iii) a first control unit for supplying said first signal to said control information buffer when said memory operand is queued in said first storage means.

7. A central processing unit as claimed in claim 5, wherein said control information buffer includes:

(i) a second storage means for queuing said second control information and supplying said queued second control information to said arithmetic unit;

(ii) a third storage means for queuing the third control information and generating a third control signal representing said third control information;

(iii) a second control unit connected to said second storage means for outputting said second signal, and for receiving said third signal.

8. A central processing unit as claimed in claim 5, wherein said arithmetic unit includes:

(i) an arithmetic logic unit for performing arithmetic and logic operations on said operands;

(ii) and a third control unit for receiving said second signal and for outputting said third signal and a fourth signal representing that said second signal has been received, and for receiving a fifth signal representing that said second control information is valid and indicating that an operand is required from memory; and (iii) a synchronizing circuit means responsive to said first and fourth signals and to said third control information from said control information buffer for supplying said fifth signal.

9. A central processing unit comprising:

(a) an instruction decoder (1) for decoding an instruction to generate a first control signal indicating first control information (12), which includes information for operand address computation and a memory access, and a second control signal indicating second control information (13A), which includes information for representing the kind of operation, operands for sources and destinations and third control information (13B) for showing whether or not an operand in the memory is required;

(b) an operand address computation unit (2) connected to said instruction decoder for receiving the first control signal indicating the first control information from said instruction decoder and computing the operand address in accordance with the first control information and generating an operand address signal indicating the computed operand address;

(c) an operand prefetch unit (3) connected to said operand address computation unit for receiving the operand address signal indicating the computed operand address from said operand address computation unit, for fetching and queuing a memory operand in accordance with the operand address and for then generating a memory operand signal representing the queued memory operand and a first signal (9) representing that the memory operand has been queued therein;

(d) a control information buffer (5) connected to said instruction decoder for receiving the first signal and the second control signal and for then queuing the second control information and generating a second control information signal indicating the queued second control information and a second signal representing that the second control information is valid on condition that the first signal is received by said control information buffer and that the third control information indicates that an operand in the memory is required; and (e) an execution unit (4) connected to both of said operand pre-fetch unit and said control information buffer for receiving the second signal and, in response to the received second signal, outputting a third signal representing that said execution unit requires the queued second control information to said control information buffer, wherein said control information buffer outputs the second control information signal to said execution unit in response to the third signal, and said execution unit then receives the memory operand signal indicating the memory operand and the second control information signal indicating the second control information and thereafter executes an operation in accordance with the second control information and the memory operand.

10. A central processing unit as claimed in claim 9, wherein said operand prefetch unit buffer includes:
(i) an operand reader (20) for reading the memory operand from the first control signal sent from said operand address computation unit;
(ii) a first storage means (15) for queuing the memory operand to send the memory operand to said execution unit; and
(iii) a first control unit (21) for sending the first signal to said control information buffer when the memory operand is queued in said first storage means.

11. A central processing unit as claimed in claim 9, wherein said control information buffer includes:
(i) a second storage means (30) for queuing the second control information to send the second control information to said execution unit;
(ii) a third storage means (31) for queuing the third control information and generating a third control signal indicating the third control information;
(iii) a second control unit (32) connected to said second storage means for outputting a fourth signal representing that the second control information has been queued in said second storage means and for receiving the third signal; and
(iv) a synchronizing circuit means (33) connected to both of said third storage means and said second control unit for receiving the first and fourth signals and the third control signal and the third control information from said third storage means, and for outputting the second signal in response to the first and fourth signals and the third control signal.

12. A central processing unit as claimed in claim 9, wherein said execution unit includes:
(i) a data operation unit (18 and 40) for executing the operation and storing the result of the operation performed therein; and
(ii) a third control unit (42) for receiving the second signal and for outputting the third signal to said control information buffer.

13. A central processing unit comprising:
(a) an instruction decoder (1) for decoding an instruction to generate a first control signal indicating first control information (12), which includes information for operand address computation and a memory access, and a second control signal indicating second control information (13A), which includes information for representing the kind of operation, operands for sources and destinations, and third control information (13B) for showing whether or not an operand in the memory is required;

(b) an operand address computation unit (2) connected to said instruction decoder for receiving the first control signal indicating the first control information from the instruction decoder and computing the operand address in accordance with the first control information and generating an operand address signal indicating the computed operand address;

(c) an operand prefetch unit (3) connected to said operand address computation unit for receiving the operand address signal indicating the computed operand address from said operand address computation unit, for fetching and queuing a memory operand in accordance with the operand address and for then generating a memory operand signal representing the queued memory operand and a first signal (9) representing that the memory operand has been queued therein;

(d) a control information buffer (5A) connected to said instruction decoder for receiving the second control signal and for then queuing the second control information and the third control information and for generating a second control information signal indicating the queued second control information and a third control information signal indicating the queued third control information and a second signal representing that the second control information has been queued therein; and (e) an execution unit (4A) connected to both of said operand pre-fetch unit and said control information buffer for receiving the first signal, the second signal and the third control information signal and, in response to the received first signal and the second signal and the third control information signal, outputting to said control information buffer a third signal representing that the second control information is valid on condition that the first signal is received therein and that the third control information indicates that said execution unit requires an operand in the memory, wherein aid control information buffer outputs the second control information signal to said execution unit in response to the third signal, and said execution unit then receives the memory operand signal indicating the memory operand and the second control information signal indicating the second control information and thereafter executes an operation in accordance with the second control information and the memory operand.

14. A central processing unit as claimed in claim 13, wherein said operand pre-fetch unit includes:
  (i) an operand reader (20) for reading said memory operand;
  (ii) a first storage means (15) for queuing said memory operand to send said memory operand to said execution unit;
  (iii) a first control (21 for sending said first signal to said execution unit when said memory operand is queued in said first storage means.

15. A central processing unit as claimed in claim 13, wherein said control information buffer includes:
  (i) a second storage means (30) for queuing said second control information to send said second control information to said execution unit;
  (ii) a third storage means (31) for queuing and outputting said third control information; and
  (iii) a second control unit (32) for outputting said second signal, and for receiving said third signal.

16. A central processing unit as claimed in claim 13, wherein said execution unit includes:
  (i) a data operation unit (18 and 40) for executing the operation and storing the result of the operation performed therein;
  (ii) a third control unit (42A) for receiving said second signal and for outputting said third signal and a fourth signal representing that said second signal has been received, and for receiving a fifth signal representing that said second control information is valid; and
  (iii) a synchronizing circuit means (33) responsive to said first and fourth signals and said third control information from said control information buffer for outputting said fifth signal.

17. A central processing unit comprising:
  (a) an instruction decoder (1) for decoding an instruction to generate a first control signal indicating first control information (12), which includes information for operand address computation and a memory access, and a second control signal indicating second control information (16B), which includes information for representing the kind of operation, and third control information (18A), which includes information for representing operands for sources and destinations;
  (b) an operand address computation unit (2) connected to said instruction decoder for receiving the first control signal indicating the first control information from said instruction decoder and computing the operand address in accordance with the first control information and generating an operand address signal indicating the computed operand address;
  (c) an operand prefetch unit (3) connected to said operand address computation unit for receiving the operand address signal indicating the computed operand address from said operand address computation unit, for fetching and queuing a memory operand in accordance with the operand address and for then generating a memory operand signal representing the queued memory operand and a first signal (9) representing that the memory operand has been queued therein;
  (d) a control information buffer (5B) connected to said instruction decoder for receiving the first signal and the second control signal and for then queuing the second control information and the third control information and generating a second control information signal indicating the queued second control information and a second signal representing that the second control information and the third control information are valid on condition that the first signal is received by said control information buffer and that the third control information requires the memory operand; and
  (e) an execution unit (4) connected to both of said operand pre-fetch unit and said control information buffer for receiving the second signal and, in response to the received second signal, outputting a third signal representing that said execution unit requires the queued second control information to said control information buffer, wherein said control information buffer outputs the second control information signal and a third control information signal indicating the third control information to said execution unit in response to the third signal, and said execution unit then receives the memory operand signal indicating the memory operand and the second control information signal indicating the second and third control information and thereafter executes an operation in accordance with the second and third control information and the memory operand.

18. A central processing unit as claimed in claim 17, wherein said operand pre-fetch unit includes:
  (i) an operand reader (20) for reading said memory operand;
  (ii) a first storage means (15) for queuing said memory operand to send said memory operand to said execution unit; and
  (iii) a first control unit (21) for sending said first signal to said control information buffer when said memory operand is queued in said first storage means.

19. A central processing unit as claimed in claim 17, wherein said control information buffer includes:
  (i) a second storage means (30) for queuing said second control information and said control information to send said second control information and said third control information to said execution unit;
  (ii) a second control unit (32A) for outputting a fourth signal representing that said second control information and said third control information have been queued in said second storage means, and for receiving said third signal;
  (iii) a decoder (36) for decoding said third control information thereby outputting a fifth signal representing that said third control information requires said memory operand; and (iv) a synchronizing circuit means (33) responsive to said first, fourth, and fifth signals for outputting said second signal.

20. A central processing unit as claimed in claim 17, wherein said execution unit includes:
   (i) a data operation unit (18 and 40) for executing the operation and storing the result of the operation performed therein; and
   (ii) a third control unit (42) for receiving said second signal and for outputting said third signal to said control information buffer.

21. A central processing unit comprising:
   (a) an instruction decoder (1) for decoding an instruction to generate a first control signal indicating first control information (12), which includes information for operand address computation and a memory access, and a second control signal indicating second control information (16B), which includes information for representing the kind of operation, and third control information (18A), which includes information for representing operands for sources and destinations;
   (b) an operand address computation unit (2) connected to said instruction decoder for receiving the first control signal indicating the first control information from said instruction decoder and computing the operand address in accordance with the first control information and generating an operand address signal indicating the computed operand address;
   (c) an operand prefetch unit (3) connected to said operand address computation unit for receiving the operand address signal indicating the computed operand address from said operand address computation unit, for fetching and queuing a memory operand in accordance with the operand address and for then generating a memory operand signal representing the queued memory operand and a first signal (9) representing that the memory operand has been queued therein;
   (d) a control information buffer (5C) connected to said instruction decoder for receiving the second control signal and for then queuing the second control information and the third control information and for generating a second control information signal indicating the queued second and third control information and a second signal representing that the second and third control information have been queued therein; and
   (e) an execution unit (4B) connected to both of said operand pre-fetch unit and said control information buffer for receiving the first signal and the second signal and, in response to the received first and second signals, outputting to said control information buffer a third signal representing that the second control information and the third control information is valid on condition that the first signal is received therein and that the third control information indicates that said execution unit requires an operand in the memory, wherein said control information buffer outputs the second control information signal to said execution unit in response to the third signal, and said execution unit then receives the memory operand signal indicating the memory operand and the second control information signal indicating the second control information and thereafter executes an operation in accordance with the second control information, the third control information and the memory operand.

22. A central processing unit as claimed in claim 21, wherein said operand pre-fetch includes:
   (i) an operand reader (20) for reading said memory operand;
   (ii) a first storage means (15) for queuing said memory operand to send said memory operand to said execution unit; and
   (iii) a first control unit (21) for sending said first signal to said execution unit when said memory operand is queued in said first storage means.

23. A central processing unit as claimed in claim 21, wherein said control information buffer includes:
   (i) a second storage means (30) for queuing said second control information and said third control information to send said second control information and said third control information to said execution unit; and
   (ii) a second control unit (32) for outputting said second control signal, and for receiving said third signal.

24. A central processing unit as claimed in claim 21, wherein said execution unit includes:
   (i) a data operation unit (18 and 40) for executing the operation and storing the result of the operation performed therein;
   (ii) a decoder (36) for decoding said third control information thereby outputting a fourth signal representing that said third control information requires said memory operand;
   (iii) a third control unit (42B) for outputting said third signal and a fifth signal representing that said second signal has been received, and for receiving said second signal and a sixth signal representing that said second and said third control information are valid; and
   (iv) a synchronizing circuit means (33) responsive to said first, fourth, and fifth signals for outputting said sixth signal.

* * * * *